United States Patent
Chang

(10) Patent No.: US 10,759,457 B1
(45) Date of Patent: Sep. 1, 2020

(54) CART HAVING FOLDING LEGS

(71) Applicant: Chin-Chin Chang, Taichung (TW)

(72) Inventor: Chin-Chin Chang, Taichung (TW)

(*) Notice: Subject to any disclaimer, the term of this patent is extended or adjusted under 35 U.S.C. 154(b) by 0 days.

(21) Appl. No.: 16/506,170

(22) Filed: Jul. 9, 2019

(51) Int. Cl.
*B62B 1/12* (2006.01)

(52) U.S. Cl.
CPC ............ *B62B 1/12* (2013.01); *B62B 2205/24* (2013.01); *B62B 2205/26* (2013.01); *B62B 2206/006* (2013.01)

(58) Field of Classification Search
CPC .... B62B 1/04; B62B 1/12; B62B 1/20; B62B 3/02; B62B 2205/24; B62B 2205/26; B62B 2206/006
See application file for complete search history.

(56) References Cited

U.S. PATENT DOCUMENTS

| | | | | |
|---|---|---|---|---|
| 2,944,862 A | * | 7/1960 | Heil | A47B 3/10 312/237 |
| 4,471,969 A | * | 9/1984 | Zabala | A47C 4/52 108/129 |
| 6,698,361 B2 | * | 3/2004 | Lung | A47B 3/02 108/118 |
| 9,357,842 B2 | * | 6/2016 | Gu | A47B 85/06 |
| 2007/0261916 A1 | * | 11/2007 | Sward | G01N 33/497 182/129 |
| 2009/0199746 A1 | * | 8/2009 | Horton | A47B 3/087 108/129 |
| 2010/0032927 A1 | * | 2/2010 | Gordon | B62B 5/06 280/659 |
| 2018/0263372 A1 | * | 9/2018 | Rohrer | A47C 4/04 |
| 2020/0107641 A1 | * | 4/2020 | Weldon | B62B 1/12 |

* cited by examiner

*Primary Examiner* — Erez Gurari

(57) ABSTRACT

A folding cart includes a frame including front and rear plates having two inner extensions with a fastening hole, and four corner plates having a first pivot hole, a first hole, and an oval second hole; two rear wheels; four legs having a second pivot hole, a first hole member, and a second hole member; and four folding devices each including a trigger including two bent wings having a first through hole, and a top projection having a second through hole; a first pivot driven through the first pivot hole, the second pivot hole, and the fastening hole; a second pivot driven through the second hole member and the first through holes; a spring loaded pin driven through the first hole member and the second through hole; and a clip ring partially disposed in the groove and urging against the projection.

3 Claims, 12 Drawing Sheets

CART HAVING FOLDING LEGS

BACKGROUND OF THE INVENTION

1. Field of the Invention

The invention relates to carts and more particularly to a cart having folding legs with improved characteristics.

2. Description of Related Art

Folding carts are well known in the art. For example, a conventional folding cart comprising two rear legs each formed of an upper member which is pivoted to swing forwardly and a lower member which is pivoted to the upper member to swing rearward. Thus, upon collapse, the upper and lower members of each rear leg form a V and hence the distance which the rear legs must project rearward of their connection to a bed of the cart is shortened by a predetermined distance.

While the device enjoys its success in the market, continuing improvements in the exploitation of cart having folding legs of this type are constantly being sought.

SUMMARY OF THE INVENTION

It is therefore one object of the invention to provide a folding cart comprising a rectangular frame including front and rear plates each having two spaced inner extensions with a fastening hole, a support extending forward from the front plate, four corner plates each having a first pivot hole, a first hole, and an oval second hole, and a handle extending from the rear plate; two wheel mounts extending rearward from the rear plate; two rear wheels rotatably secured to the wheel mounts respectively; four legs each having, at an upper portion, a second pivot hole, a first hole member, and a second hole member; four folding devices each comprising a trigger including two bent wings each having a first through hole, and a projection extending upward and having a second through hole; a first pivot driven through the first pivot hole, the second pivot hole, and the fastening hole to pivotably fasten the upper portion of the leg between the corner plate and the inner extension; a second pivot driven through the second hole member and the first through holes to pivotably secure the trigger to the upper portion of the leg; a pin driven through the first hole member and the second through hole and having an enlarged head, a shoulder adjacent to the head, and an annular groove at an end; a biasing member put on the pin and disposed in the first hole member, the biasing member having one end urging against the shoulder and a clip ring partially disposed in the groove and urging against an outer surface of the projection; wherein in an unfolded position, the head is through the first hole and a portion of the first hole member, and an upper portion of the trigger urges against the upper portion of the leg; and wherein in a folded position, the head is through the oval second hole of the corner plate and a portion of the first hole member of the leg, and an upper portion of the trigger urges against the upper portion of the leg.

The above and other objects, features and advantages of the invention will become apparent from the following detailed description taken with the accompanying drawings.

DETAILED DESCRIPTION OF THE INVENTION

Figure 1:
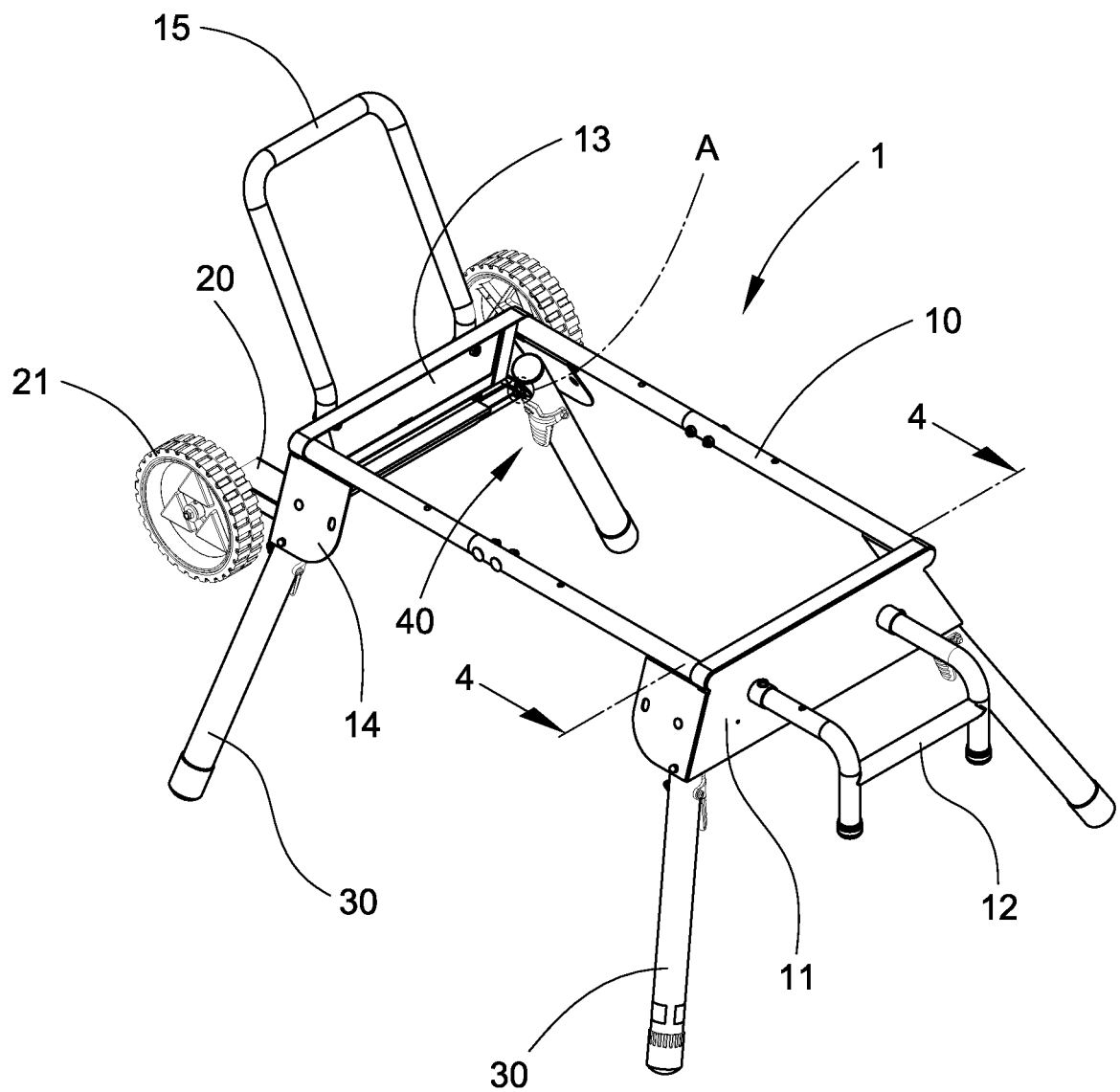
FIG. 1 is a perspective view of a cart according to the invention.
Figure 1A:
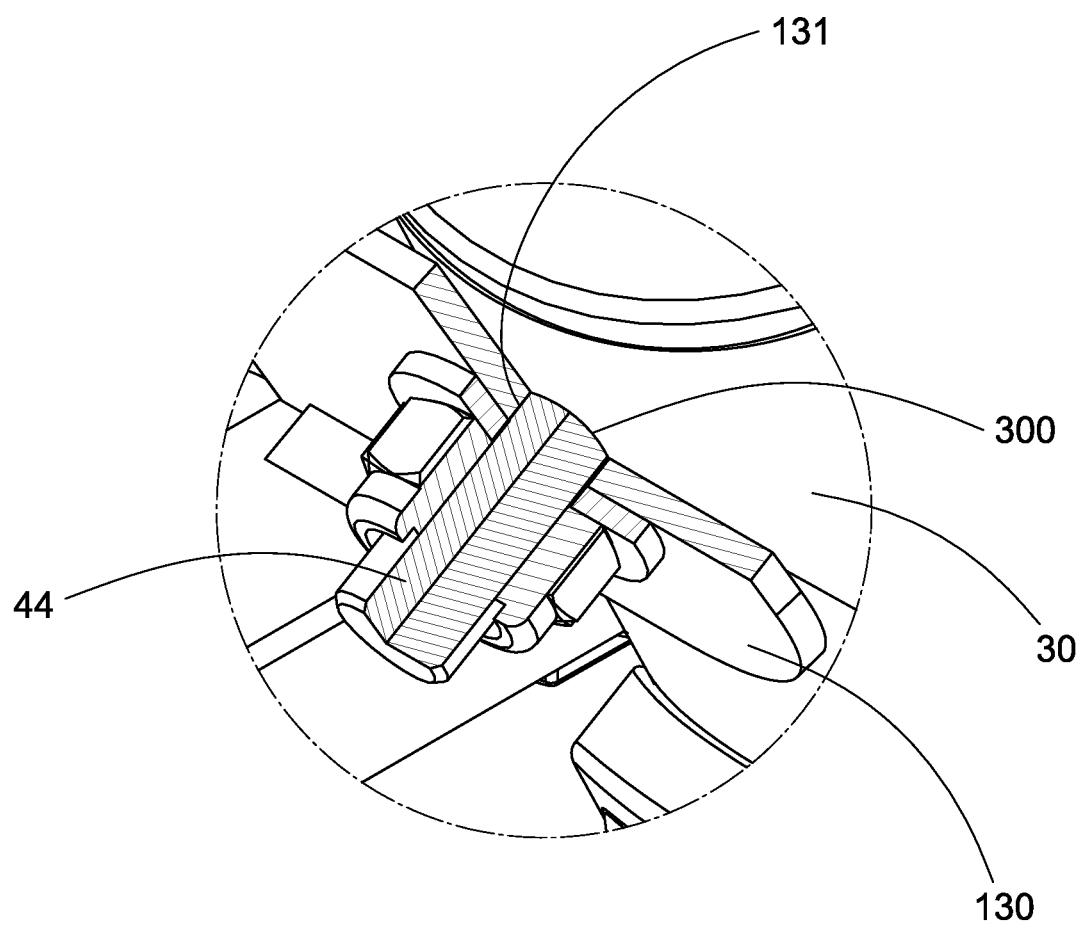
FIG. 1A is a detailed view, in part section of the area in circle A of FIG. 1 showing the first pivot and the fastening hole of a rear portion of the cart.
Figure 2:
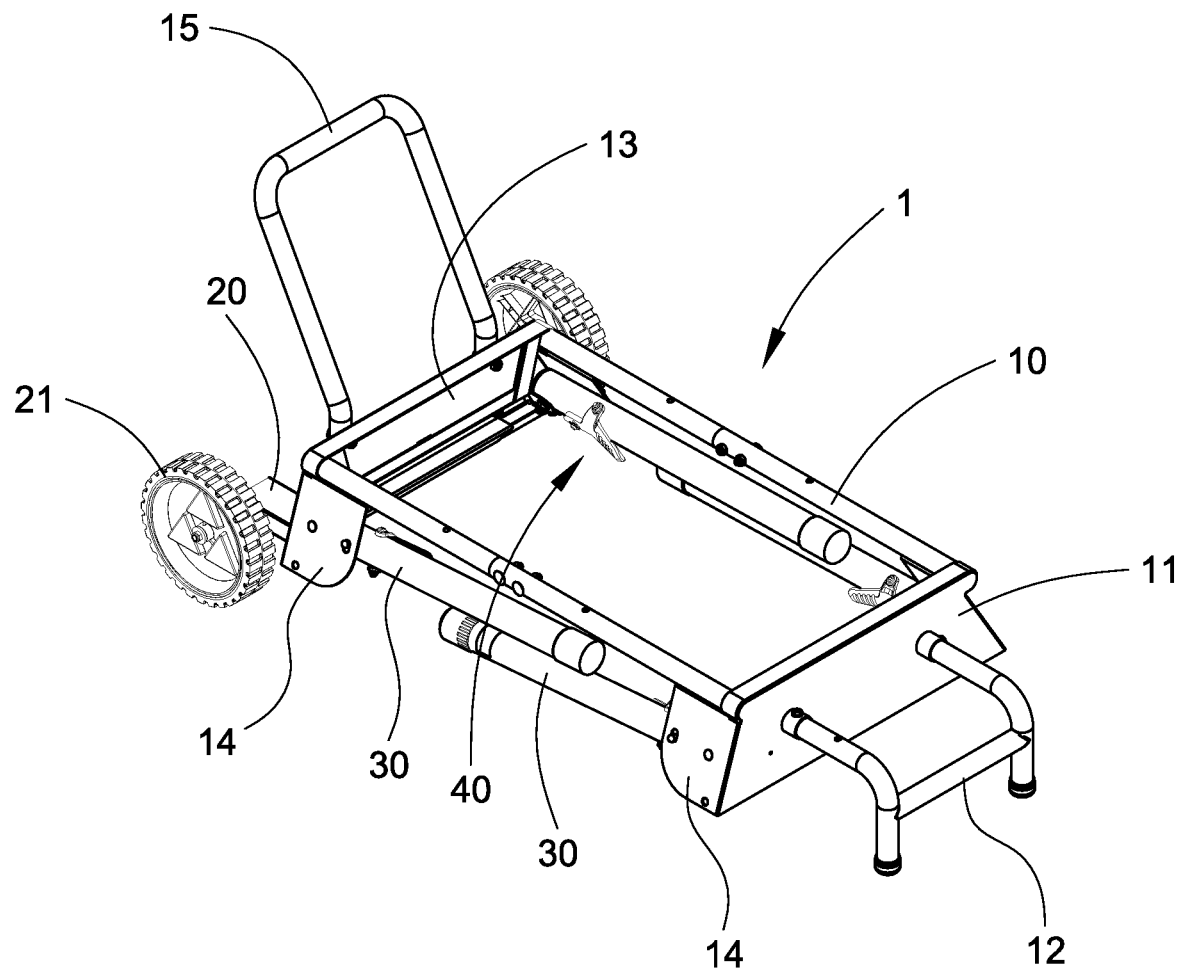
FIG. 2 is a perspective view of the cart with four legs folded.
Figure 3:
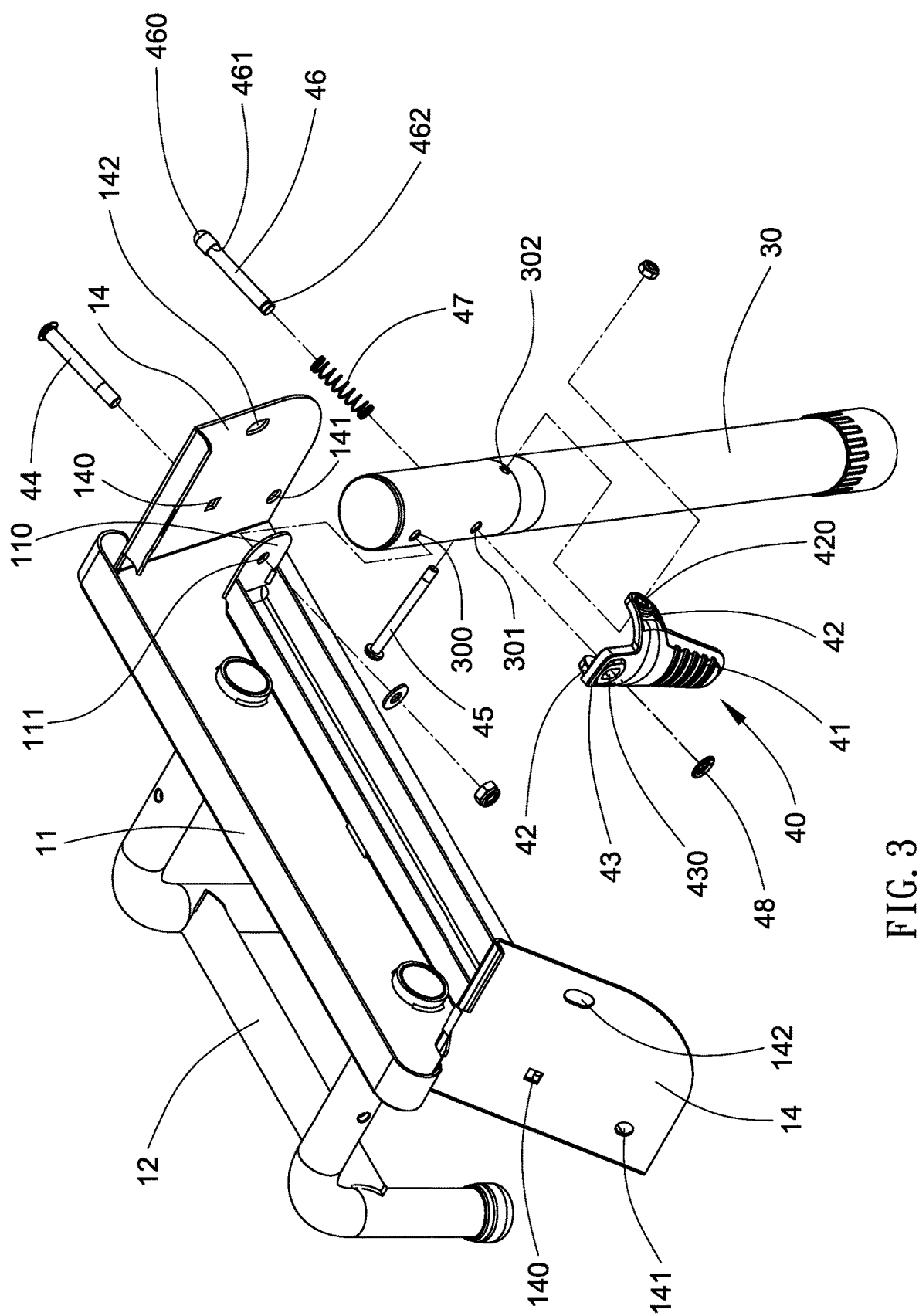
FIG. 3 is an exploded view of front components of the cart.

Referring to FIGS. 1 to 9, a cart 1 in accordance with the invention comprises a rectangular frame 10 including a front plate 11 having two greatly spaced inner extensions 110 each with a fastening hole 111, a support 12 extending forward from the front plate 11, a rear plate 13 having two greatly spaced inner extensions 130 each with a fastening hole 131, four corner plates 14 each having a pivot hole 140, a first hole 141, and an oval second hole 142, and an n-shaped handle 15 extending upward, rearward from the rear plate 13; two wheel mounts 20 extending rearward from the rear plate 13; two rear wheels 21 rotatably secured to the wheel mounts 20 respectively; four legs 30 each having, at an upper portion, two pivot holes 300, two first hole members 301, and two second hole members 302; and four folding devices which are the subjects of the invention and are described in detail below.

The folding device comprises a trigger 40 including a knurled member 41, two bent wings 42 each having a first through hole 420, and a projection 43 extending upward and having a second through hole 430; a first pivot 44 driven through the pivot hole 140, the two pivot holes 300, and the fastening hole 111 to pivotably fasten the upper portion of the leg 30 between the corner plate 14 and the inner extension 110; a second pivot 45 driven through the two second hole members 302 and the two first through holes 420 to pivotably secure the trigger 40 to the upper portion of the leg 30; and a pin 46 through the two first hole members 301 and the second through hole 430 and having an enlarged head 460, a shoulder 461 adjacent to the head 460, and an annular groove 462 at an end; a torsion spring 47 put on the pin 46 and disposed between the two first hole members 301, the torsion spring 47 having one end urging against the shoulder 461; and a clip ring 48 partially disposed in the groove 462 and urging against an outer surface of the projection 43.

Figure 4:
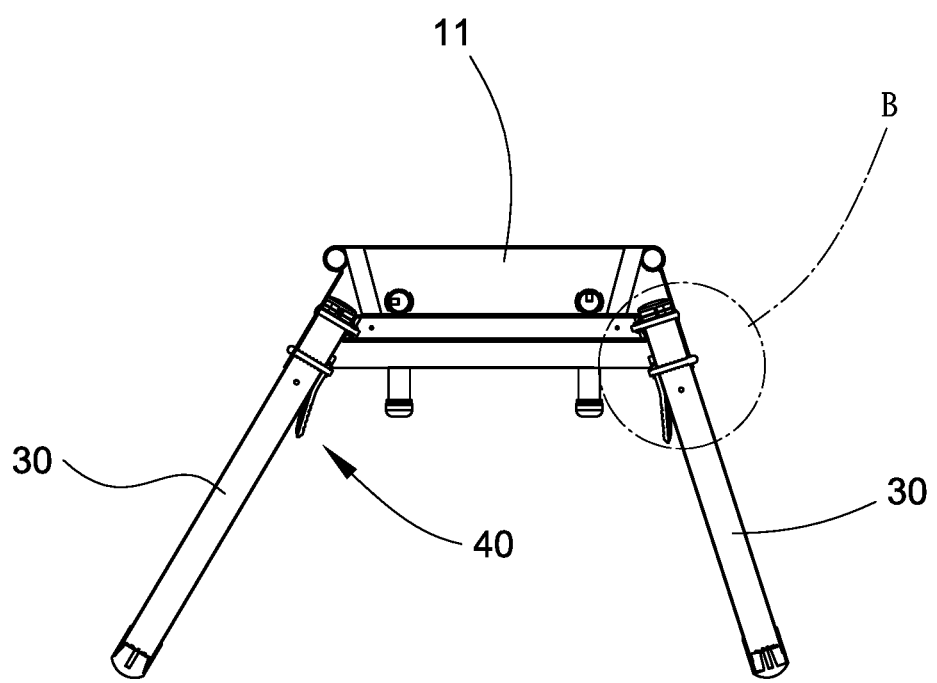
FIG. 4 is a sectional view taken along line 4-4 of FIG. 1 showing the folding device of a front portion of the cart.
Figure 4A:
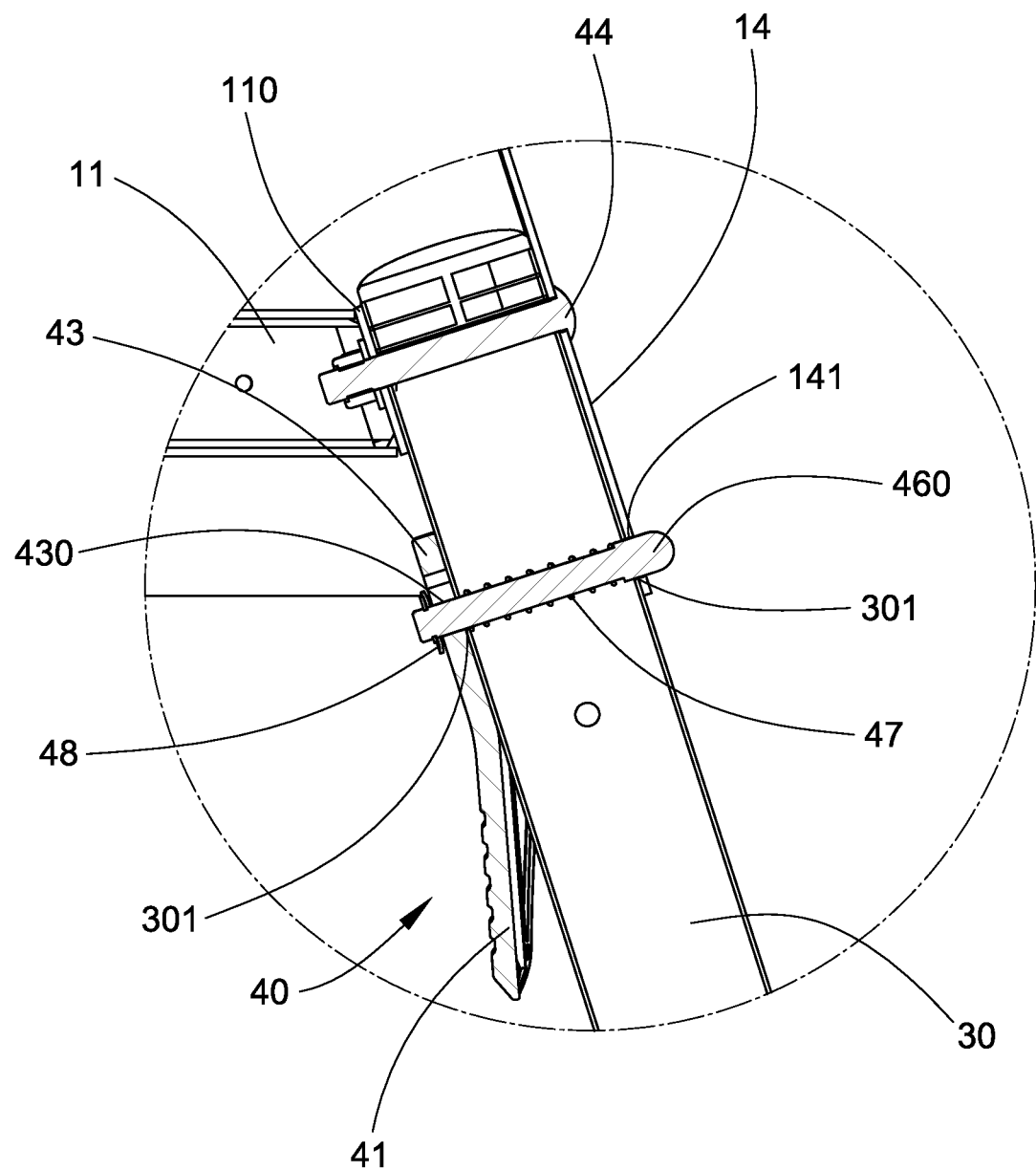
FIG. 4A is a detailed view of the area in circle B cf FIG. 4 showing the trigger being in a not pressed state and the leg being fastened.
Figure 4B:
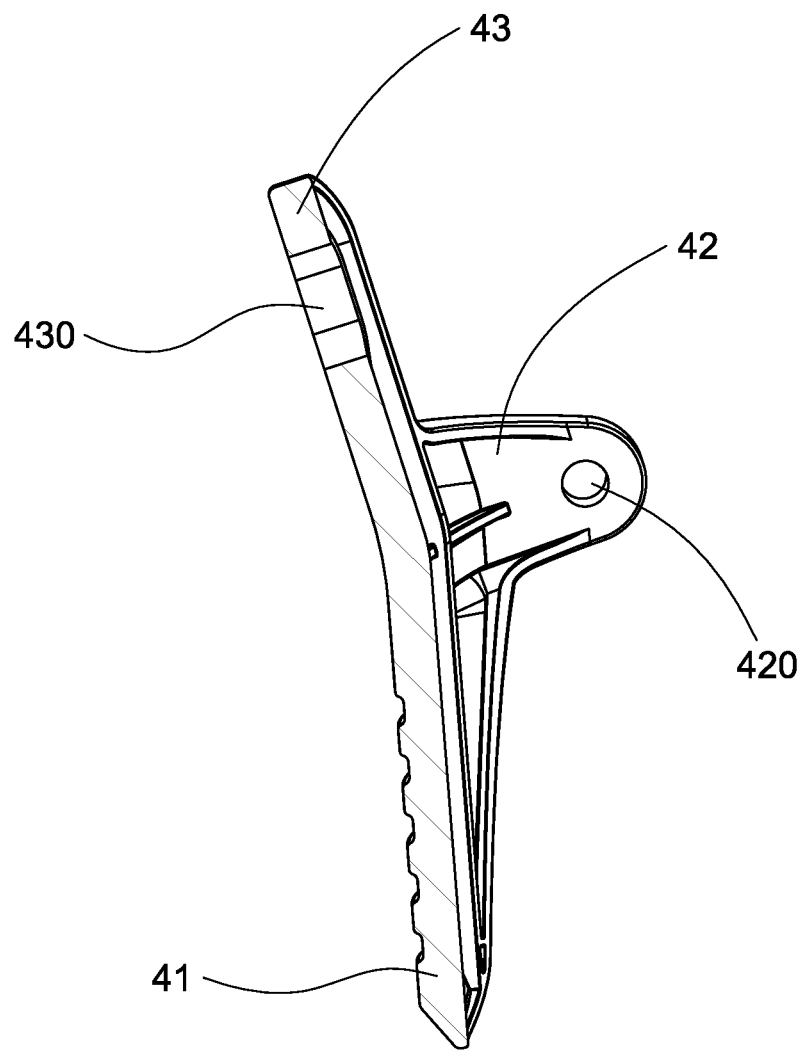
FIG. 4B is a longitudinal sectional view of the trigger.

In an unfolded position, the head 460 is through the first hole 141 and a portion of the first hole member 301, and an upper portion of the trigger 40 urges against the upper portion of the leg 30 (see FIG. 4A).

Figure 5:
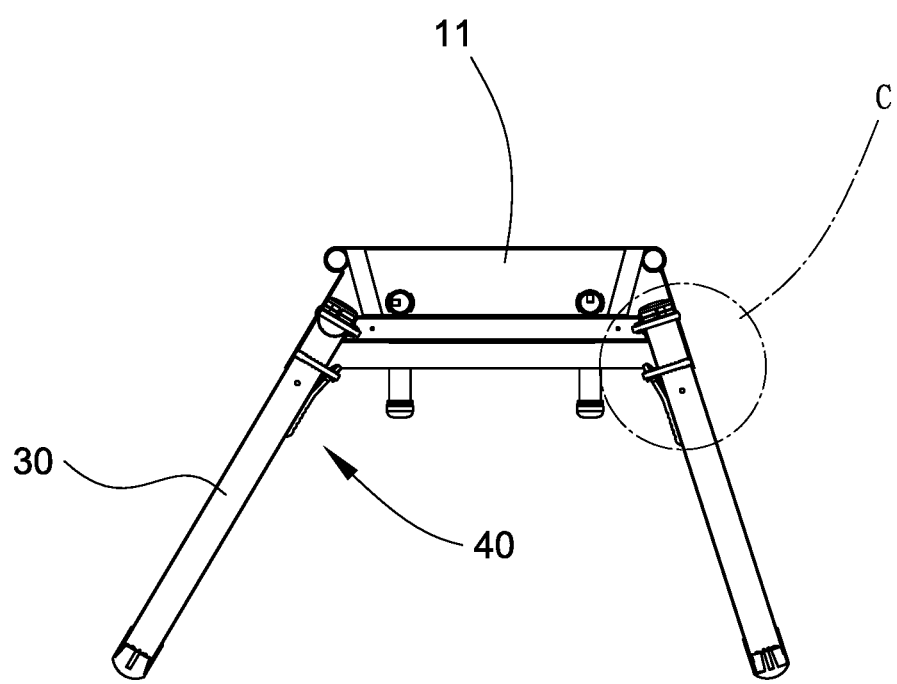
FIG. 5 is a view similar to FIG. 4 showing the trigger being pressed and the leg being ready to fold.
Figure 5A:
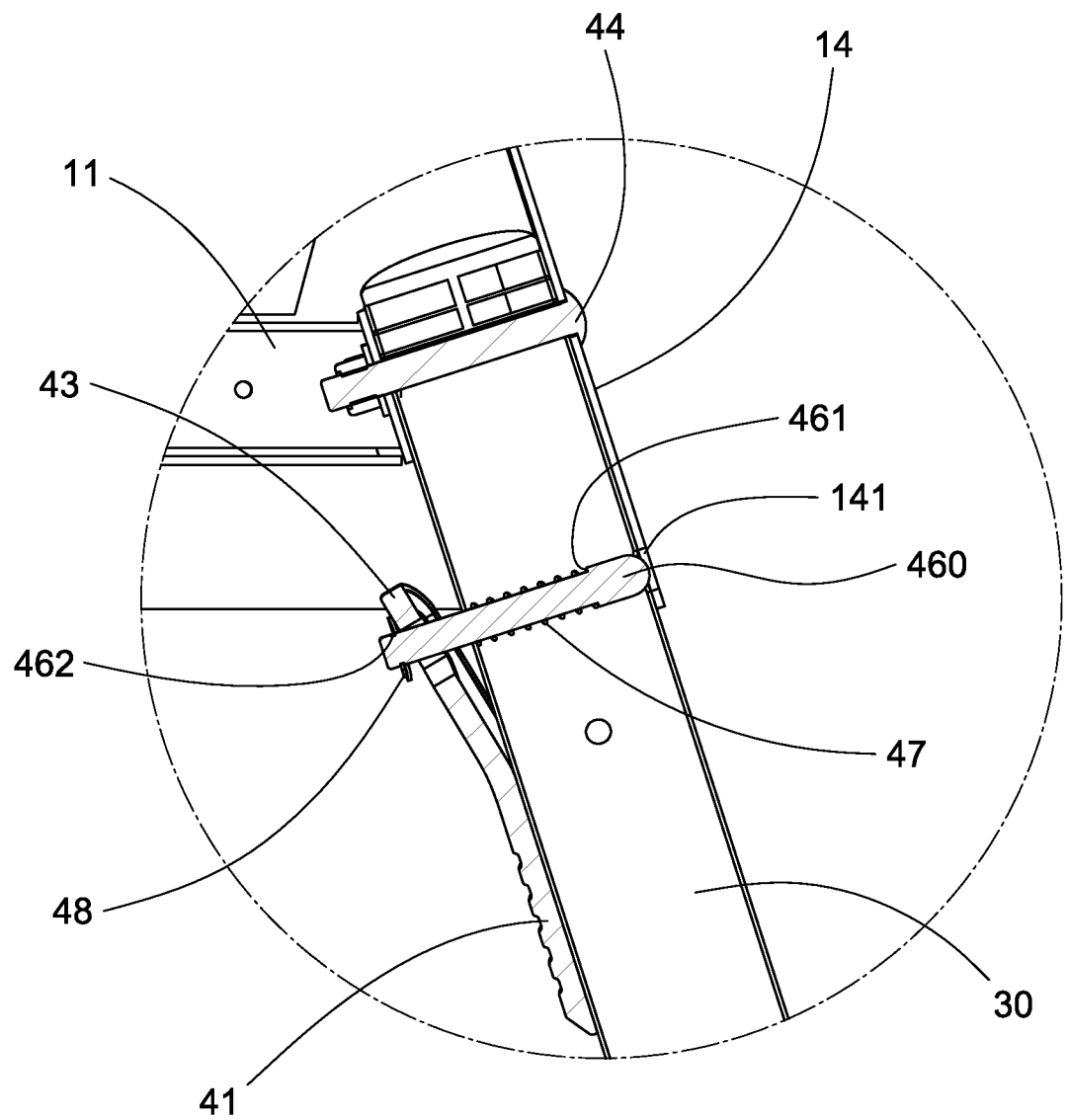
FIG. 5A is a detailed view of the area in circle C of FIG. 5.
Figure 6:
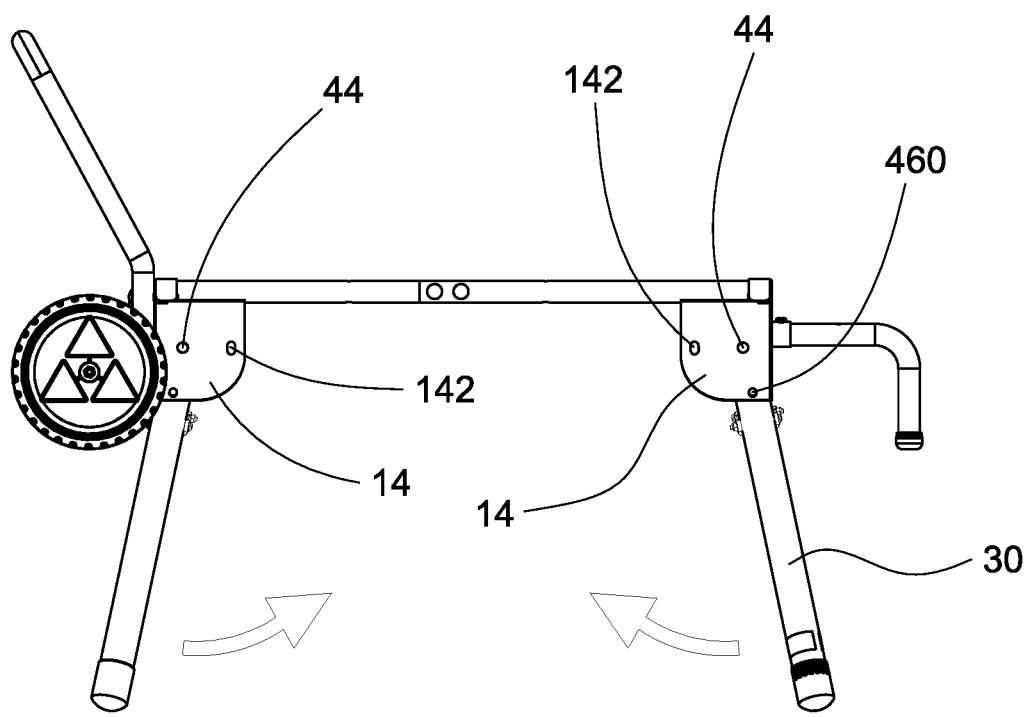
FIG. 6 is a side elevation of FIG. 1 showing legs being ready to fold.
Figure 7:
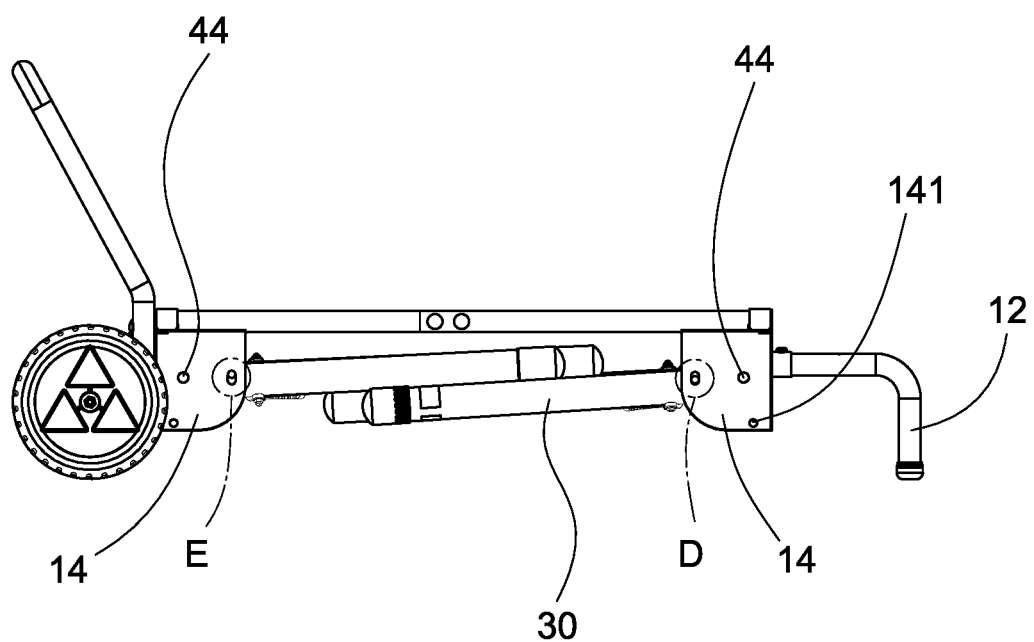
FIG. 7 is a view similar to FIG. 6 where the legs are folded.
Figure 8:
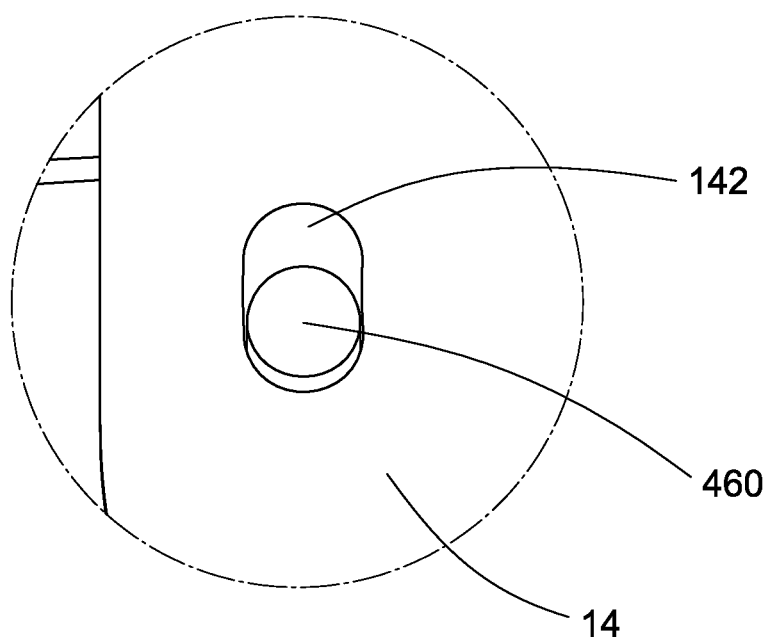
FIG. 8 is a detailed view of the area in circle D of FIG. 7.
Figure 9:
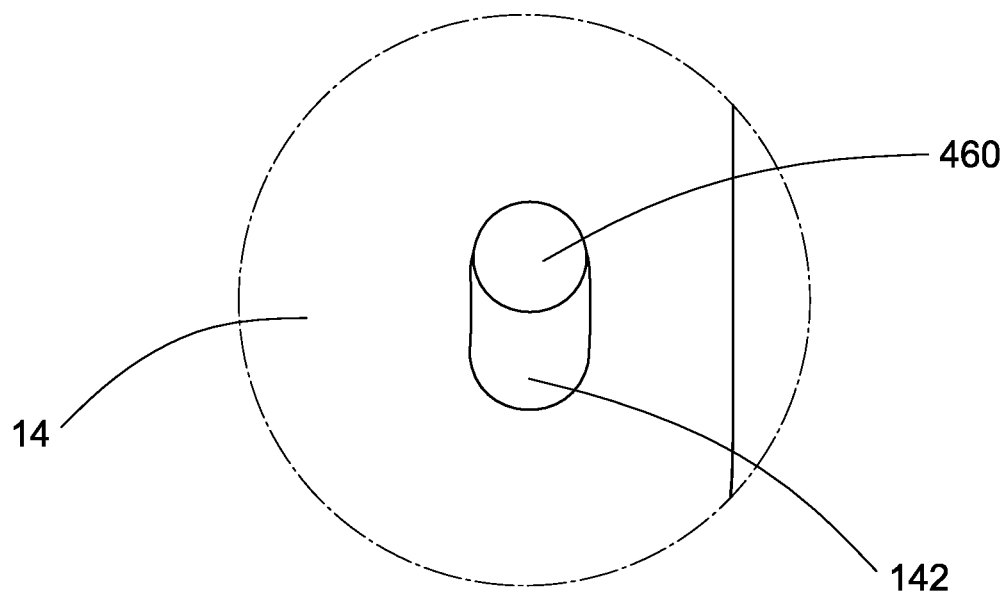
FIG. 9 is a detailed view of the area in circle E of FIG. 7.

In a folding operation, an individual may press the trigger 40 and press the head 460 respectively to compress the torsion spring 47 until the head 460 clears the first hole 141. At this position (see FIG. 5A), the upper portion of the trigger 40 disengages from the upper portion of the leg 30, i.e., the legs 30 unlocked. Then, the individual may pivot the rear ones of the legs 30 to a position under the frame 10, and pivot the front ones of the legs 30 to a position under the frame 10 sequentially until the legs 30 are locked. In the locked position, the head 460 is resiliently urged against a lower end of the oval second hole 142 of either front one of the front corner plates 14 (see FIG. 8) or at an upper end of the oval second hole 142 of either rear one of the rear corner plates 14 (see FIG. 9).

While the invention has been described in terms of preferred embodiments, those skilled in the art will recognize that the invention can be practiced with modifications within the spirit and scope of the appended claims.

What is claimed is:

1. A folding cart, comprising:
    a rectangular frame including front and rear plates each having two spaced inner extensions with a fastening hole, a support extending forward from the front plate, four corner plates each having a first pivot hole, a first hole, and an oval second hole, and a handle extending from the rear plate;
    two wheel mounts extending rearward from the rear plate;
    two rear wheels rotatably secured to the wheel mounts respectively;
    four legs each having, at an upper portion, a second pivot hole, a first hole member, and a second hole member;
    four folding devices each comprising:
    a trigger including two bent wings each having a first through hole, and a projection extending upward and having a second through hole:
    a first pivot driven through the first pivot hole, the second pivot hole, and the fastening hole to pivotably fasten the upper portion of the leg between the corner plate and the inner extension;
    a second pivot driven through the second hole member and the first through holes to pivotably secure the trigger to the upper portion of the leg;
    a pin driven through the first hole member and the second through hole and having an enlarged head, a shoulder adjacent to the head, and an annular groove at an end;
    a biasing member put on the pin and disposed in the first hole member, the biasing member having one end urging against the shoulder; and
    a clip ring partially disposed in the groove and urging against an outer surface of the projection;
    wherein in an unfolded position, the head is through the first hole of the corner plate and a portion of the first hole member of the leg, and an upper portion of the trigger urges against the upper portion of the leg; and
    wherein in a folded position, the head is through the oval second hole of the corner plate and a portion of the first hole member of the leg, and an upper portion of the trigger urges against the upper portion of the leg.

2. The folding cart of claim 1, wherein in a folded position the rear ones of the legs is under the frame, the front ones of the legs is under the frames, and the head is at a lower end of the oval second hole of either front one of the corner plates or at an upper end of the oval second hole of either rear one of the corner plates.

3. The folding cart of claim 1, wherein the trigger further comprises a knurled member.

* * * * *